US 9,417,871 B2

(12) United States Patent
Christopher et al.

(10) Patent No.: US 9,417,871 B2
(45) Date of Patent: Aug. 16, 2016

(54) AUTOMATIC GENERATION OF CERTIFICATE OF ORIGIN (COO) FOR SOFTWARE SYSTEMS

(71) Applicant: AMERICAN MEGATRENDS, INC., Norcross, GA (US)

(72) Inventors: Samvinesh Christopher, Suwanee, GA (US); Anurag Bhatia, Lilburn, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 14/564,518

(22) Filed: Dec. 9, 2014

(65) Prior Publication Data
US 2016/0162287 A1    Jun. 9, 2016

(51) Int. Cl.
*G06F 9/44* (2006.01)
(52) U.S. Cl.
CPC ... *G06F 8/71* (2013.01); *G06F 8/73* (2013.01)
(58) Field of Classification Search
CPC ..................................... G06F 8/71; G06F 8/73
USPC .......................................................... 717/122
See application file for complete search history.

(56) References Cited

U.S. PATENT DOCUMENTS

2009/0177635 A1* 7/2009 Koohgoli ................. G06F 21/10
2010/0223469 A1* 9/2010 Hussain ................... G06F 21/64
                                                              713/175

* cited by examiner

*Primary Examiner* — Li B Zhen
*Assistant Examiner* — Daniel Wei
(74) *Attorney, Agent, or Firm* — Locke Lord LLP; Tim Tingkang Xia, Esq.

(57) ABSTRACT

A system includes at least one computing device. The computing device has one or more processors, a memory, and a storage storing computer executable code. The computer executable code, when executed at the processors, is configured to process a plurality of source modules to generate a plurality of binary modules corresponding to the source modules. Each source module has at least one source file and a control file including a certificate of origin (COO) of the source module, and each binary module generated from each source module has at least one corresponding binary file and a copy of the control file. Once the binary modules are generated, the computer executable code combines the binary files of each of the binary modules to generate an executable file, and generates a COO file for the executable file based on the control files from the source modules or the binary modules.

20 Claims, 3 Drawing Sheets

AUTOMATIC GENERATION OF CERTIFICATE OF ORIGIN (COO) FOR SOFTWARE SYSTEMS

FIELD

The present disclosure relates generally to automatic generation of certificate of origin (COO) for software systems, and particularly to a system and method of automatic generation of COO during compiling.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A system containing software or firmware, when shipped to end users, should include a COO. The COO lists all the software or firmware components, and the origin (developer or company) and the license associated with the components. The origin of the multiple software/firmware components may come from various location and various licenses (open source, proprietary). For example, a portable music player may include a small operating system, an audio codec, a graphical user interface (GUI), an audio player etc., each developed by different developers and sometime different vendors. Those components may vary between different embedded systems and between different versions of the same system. Accordingly, creating a COO manually is a tedious work that is time consuming and error prone.

Therefore, an unaddressed need exists in the art to address the aforementioned deficiencies and inadequacies.

SUMMARY

In one aspect, the present disclosure relates to a system. The system includes at least one computing device. The computing device has one or more processors, a memory, and a storage storing computer executable code. The computer executable code, when executed at the one or more processors, is configured to:

process a plurality of source modules to generate a plurality of binary modules corresponding to the source modules, wherein each source module has at least one source file and a control file comprising a certificate of origin (COO) of the source module, and each binary module generated from each source module has at least one binary file corresponding to the at least one source file and a copy of the control file;

combine the binary files of each of the binary modules to generate an executable file; and generate a COO file for the executable file based on the control files from the source modules or the binary modules.

In one embodiment, the COO of each source module includes at least one origin and at least one license of the corresponding source module.

In one embodiment, at least one of the source modules has a plurality of the source files having the same origin.

In one embodiment, the executable file is a software image file or a firmware image file.

In one embodiment, the computer executable code includes:

a compiling module configured to process the plurality of source modules to generate the plurality of binary modules corresponding to the source modules;

a linker module configured to combine the binary files of each of the binary modules to generate the executable file; and a control file processing module configured to generate the COO file for the executable file based on the control files from the source modules or the binary modules.

In one embodiment, the control file processing module is configured to generate the COO file by:

retrieving the control files of the binary modules; and generating the COO file for the executable file based on the retrieved control files.

In one embodiment, the control file processing module is configured to generate the COO file by:

for each of the source modules, determining whether an identifier of the source module is present in a standard reference COO file, wherein the standard reference COO file has a list of identifiers of a plurality of modules and COO information corresponding to the plurality of modules;

when the identifier of one of the source modules is present in the standard reference COO file, retrieving the COO information corresponding to the identifier from the standard reference COO file as COO information of the one of the source modules;

when the identifier of the one of the source modules is not present in the standard reference COO file, retrieving the COO information of the one of the source modules from the corresponding control file of the one of the source modules; and generate the COO file by combining the retrieved COO information of all of the source modules.

In one embodiment, the standard reference COO file is stored in the storage.

In one embodiment, the identifier of each source module is a name of the source module.

In one embodiment, the at least one source file of the source modules is programmed in a customized programming language, or a set of automation scripts.

In another aspect, the present disclosure relates to a method of generating a certificate of origin (COO) for a software or firmware. The method includes:

processing, at an automatic COO generating application being executed at one or more processors of at least one computing device, a plurality of source modules to generate a plurality of binary modules corresponding to the source modules, wherein each source module has at least one source file and a control file comprising a COO of the source module, and each binary module generated from each source module has at least one binary file corresponding to the at least one source file and a copy of the control file;

combining, by the executed automatic COO generating application, the binary files of each of the binary modules to generate an executable file; and generating, by the executed automatic COO generating application, a COO file for the executable file based on the control files from the source modules or the binary modules.

In one embodiment, the COO of each source module includes at least one origin and at least one license of the corresponding source module, and the executable file is a software image file or a firmware image file.

In one embodiment, at least one of the source modules has a plurality of the source files having the same origin.

In one embodiment, the automatic COO generating application includes:

a compiling module configured to process the plurality of source modules to generate the plurality of binary modules corresponding to the source modules;

a linker module configured to combine the binary files of each of the binary modules to generate the executable file; and a control file processing module configured to generate the COO file for the executable file based on the control files from the source modules or the binary modules.

In one embodiment, the control file processing module is configured to generate the COO file by:

retrieving the control files of the binary modules; and generating the COO file for the executable file based on the retrieved control files.

In one embodiment, the control file processing module is configured to generate the COO file by:

for each of the source modules, determining whether an identifier of the source module is present in a standard reference COO file, wherein the standard reference COO file has a list of identifiers of a plurality of modules and COO information corresponding to the plurality of modules;

when the identifier of one of the source modules is present in the standard reference COO file, retrieving the COO information corresponding to the identifier from the standard reference COO file as COO information of the one of the source modules;

when the identifier of the one of the source modules is not present in the standard reference COO file, retrieving the COO information of the one of the source modules from the corresponding control file of the one of the source modules; and generate the COO file by combining the retrieved COO information of all of the source modules.

In one embodiment, the identifier of each source module is the name of the source module.

In a further aspect, the present disclosure relates to a non-transitory computer readable medium storing computer executable code. The code, when executed at one or more processors of at least one computing device, is configured to:

process a plurality of source modules to generate a plurality of binary modules corresponding to the source modules, wherein each source module has at least one source file and a control file comprising a certificate of origin (COO) of the source module, and each binary module generated from each source module has at least one binary file corresponding to the at least one source file and a copy of the control file;

combine the binary files of each of the binary modules to generate an executable file; and generate a COO file for the executable file based on the control files from the source modules or the binary modules.

In one embodiment, the COO of each source module includes at least one origin and at least one license of the corresponding source module, and the executable file is a software image file or a firmware image file.

In one embodiment, at least one of the source modules has a plurality of the source files having the same origin.

In one embodiment, the code includes:

a compiling module configured to process the plurality of source modules to generate the plurality of binary modules corresponding to the source modules;

a linker module configured to combine the binary files of each of the binary modules to generate the executable file; and a control file processing module configured to generate the COO file for the executable file based on the control files from the source modules or the binary modules.

In one embodiment, the control file processing module is configured to generate the COO file by:

retrieving the control files of the binary modules; and generating the COO file for the executable file based on the retrieved control files.

In one embodiment, the control file processing module is configured to generate the COO file by:

for each of the source modules, determining whether an identifier of the source module is present in a standard reference COO file, wherein the standard reference COO file has a list of identifiers of a plurality of modules and COO information corresponding to the plurality of modules;

when the identifier of one of the source modules is present in the standard reference COO file, retrieving the COO information corresponding to the identifier from the standard reference COO file as COO information of the one of the source modules;

when the identifier of the one of the source modules is not present in the standard reference COO file, retrieving the COO information of the one of the source modules from the corresponding control file of the one of the source modules; and generate the COO file by combining the retrieved COO information of all of the source modules.

In one embodiment, the identifier of each source module is the name of the source module.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings.

DETAILED DESCRIPTION

Figure 1:
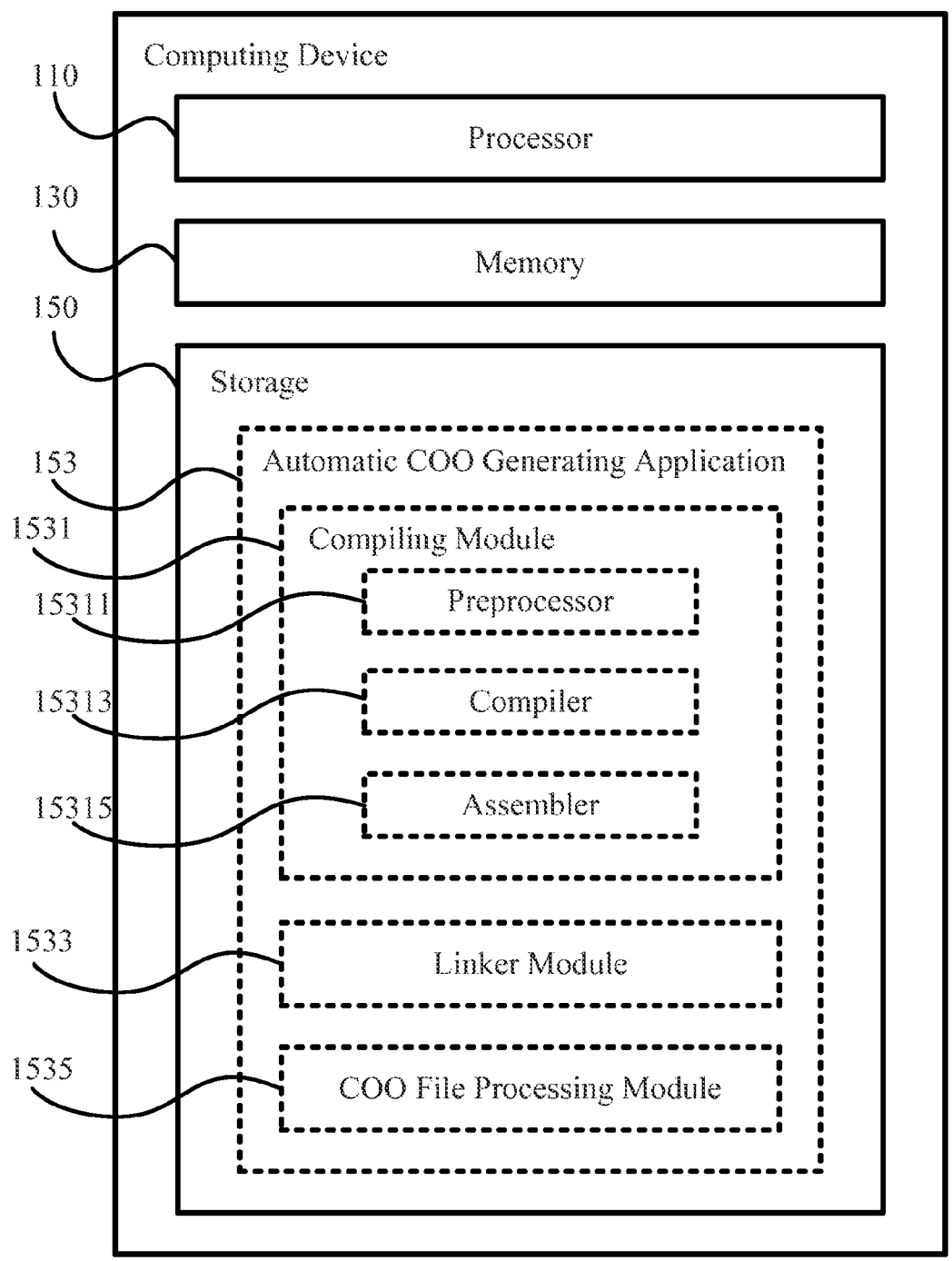
FIG. 1 schematically depicts a system for automatic generation of certificate of origin (COO) for software or firmware according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present disclosure is related to a software or firmware development process. In certain embodiments, computer executable code for software development is split into modules which are developed by different developers and then combined together to create the final firmware/software image for the system. Developers writing the modules may write their own code or get some portions from open community or other vendors. The resulting modules have different origins and licenses. Some ignore adding the license/origin altogether and some just add to the source files. In either case, the resulting binary module files will not have the license information and hence it's almost impossible to generate COO. In these cases, every developer has to go through all the binary files in the final software/firmware, figure out their component and add the origin to the COO.

In another aspect, the present disclosure is related to a system of automatic generation of certificate of origin (COO) for software or firmware without manual intervention.

FIG. 1 schematically depicts a system for automatic generation of COO for software or firmware according to certain embodiments of the present disclosure. As shown in FIG. 1, the system 100 may be a computing device, such as a general purpose computer or a headless computer. In certain embodiments, the system 100 may be a personal computer, a personal digital assistant (PDA), a mobile device, or any other devices that may be used for automatic generation of COO for the software or the firmware. In certain embodiments, the system 100 may be a system on chip (SoC).

As shown in FIG. 1, the computing device 100 has a processor 110, a memory 130, a storage 150, and any other necessary hardware components enabling the computing device 100 to operate.

The processor 110 is configured to control operation of the computer 110. The processor 110 may execute an operation system or other applications of the storage 150. In certain embodiments, the storage 150 may run on more than one processor, such as two processors, four processors, eight processors, or any suitable number of processors.

The memory 130 may be a volatile memory, such as the random-access memory (RAM), for storing the data and information during the operation of the computing device 100.

The storage 150 is a non-volatile data storage media for storing an operating system (OS) (not shown), an automatic COO generating application 153, and other applications of the computing device 100. The storage 150 may store the OS, the automatic COO generating application 153, and any other necessary software or firmware components executable at the processor 110. In certain embodiments, the OS, the automatic COO generating application 153, and any other necessary software or firmware components may be implemented as computer executable code.

The automatic COO generating application 153 may be computer executable code for one or more users to process with source modules containing source files, such as compiling the source modules to create binary modules containing binary files, and linking the binary files to form an executable file, a software image, or firmware image. As shown in FIG. 1, the automatic COO generating application 153 is stored in the storage 150. In certain embodiments, the automatic COO generating application 153 may be a part of the operating system (OS) of the computing device 100 or a part of the firmware of the computing device 100. In certain embodiments, the computing device 100 may include two or more different automatic COO generating application 153, where each of the two or more automatic COO generating application 153 may be used to process with source files.

In certain embodiments, for each source module, the source files may be programmed using one or more programming languages, and the automatic COO generating application 153 may be capable of processing (e.g., interpreting and compiling) the programming languages. Examples of the programming languages may include, but not limited to, the existing programming languages such as FORTRAN, C, C++, or Java programming languages, or a set of scripts such as shell scripts that runs automatically when being executed. In certain embodiments, the programming languages may be customized programming languages. For example, the existing programming languages such as FORTRAN, C, C++, or Java may be customized to include one or more customized commands of those programming languages. In certain embodiments, the programming languages may be customized and specialized for the computing device 100.

Referring back to FIG. 1, the automatic COO generating application 153 includes a compiling module 1531, a linker module 1533, and a COO file processing module 1535.

The compiling module 1531 may be a set of automation scripts, or a customized code or program. The compiling module 1531 is configured to compile multiple source modules to create multiple binary modules. In certain embodiments, each source module includes a plurality of source files and a control file, and the control file may include information such as an identifier, an origin, one or more licenses, and a list of the plurality of source files. In certain embodiments, the source files are written in high level programming language. The identifier of a source module may be a name of the source module. In certain embodiments, a source module and a corresponding binary module may use the same identifier to define both the source module and the corresponding binary module. In this case, the identifier is a common identifier of the module for identifying both the source module and the corresponding binary module. For example, when the identifier is a name of the module, the source module and the corresponding binary module may have the same module name. Each of the created binary modules includes a plurality of binary files corresponding to the plurality of source files, and a copy of the control file. For example, a user may execute the automatic COO generating application 153, with multiple source modules as inputs. The source files of the source modules may be for example, source code in text format. The compiling module 1531 retrieves or received the multiple source modules, and compiles the source modules to create binary modules. The binary files may be written in machine code in binary format.

In certain embodiments, the compiling module 1531 may include a preprocessor 15311, a compiler 15313, and an assembler 15315. The preprocessor 15311 is configured to processes the source files, and substitute all preprocessor directives in the original source code with actual library code that implements those directives, to form a substitution file. The compiler 15313 is configured to translate the substitution file into assembly language instructions, to form an assembly file written in assembly language. The assembler 15315 is configured to convert the assembly file to generate the binary file that is in binary format and is executable. In certain embodiments, the compiling module 1531 may not include the above preprocessor 15311, the compiler 15313 and the assembler 15315, as long as the compiling module 1531 is capable of compiling the source modules to create binary modules.

The linker module 1533 is configured to combine the plurality of binary files of the multiple binary modules into a single executable file. In certain embodiments, the generated executable file is in a binary format and may have a .exe extension. In certain embodiments, the generated executable file may be in a format of software image or a firmware image, or the generated executable file is further processed to form the software image or the firmware image.

The COO file processing module 1535 is configured to retrieve the copy of the control files from the binary modules, and generate a COO file according to the copy of the control files. Optionally, the COO file processing module 1535 may be configured to retrieve the control file from the source modules. In certain embodiments, each control file includes identifier, origin, license, and list of source files of a corresponding source module, and the copy of the control file may contains the exact same content. The COO file processing module 1535 processes the contents of the copy of the control files to generate the COO file. In certain embodiments, there may be a standard reference COO file stored in the storage 150, and the standard reference COO file contains identifiers, COO information and optionally other related information of modules. The modules listed in the standard reference COO file may include a comprehensive number of modules available in the field, or a customized number of modules that are used for a specific project or used by a specific developer group. When the standard reference COO file is available, the COO file processing module 1535 may refer to the standard reference COO file first before retrieving COO information from the copy of the control files. For example, the COO file processing module 1535 may determine identifiers of the source/binary modules, and compare the identifiers of the source/binary modules with the identifiers listed in the standard reference COO file. If the identifiers of the source/binary modules are found in the standard reference COO file, the COO file processing module 1535 retrieves COO information of the corresponding source/binary modules from the standard reference COO file. If identifiers of certain source/binary modules are not available in the standard reference COO file, the COO file processing module 1535 further retrieves the COO information of those source/binary modules from their corresponding control files or copy of the control files.

Optionally, in certain embodiments, the COO file processing module 1535 may also refer to the control files or the copy of the control files first to retrieve the COO information of certain source/binary modules, and then refer to the standard reference COO file to retrieve the COO information of the other source/binary modules.

In a further aspect, the present disclosure is related to a method of automatic generation of COO for software or firmware systems.

Figure 2:
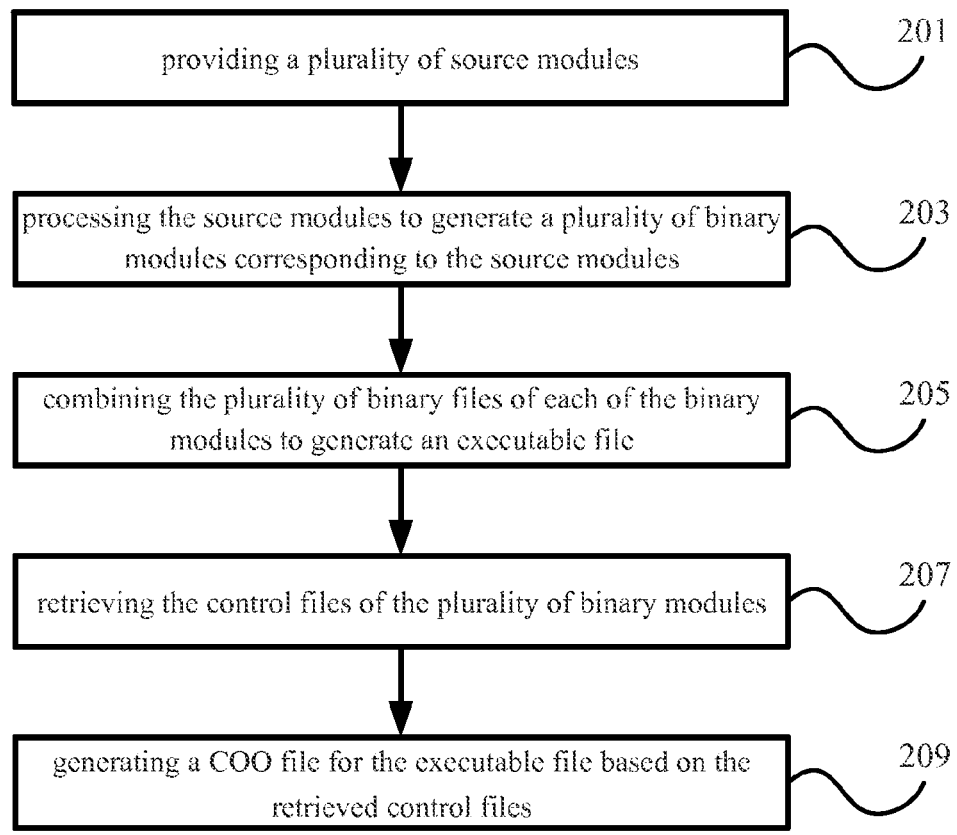
FIG. 2 schematically depicts a method of automatic generation of COO according to certain embodiments of the present disclosure.
Figure 3:
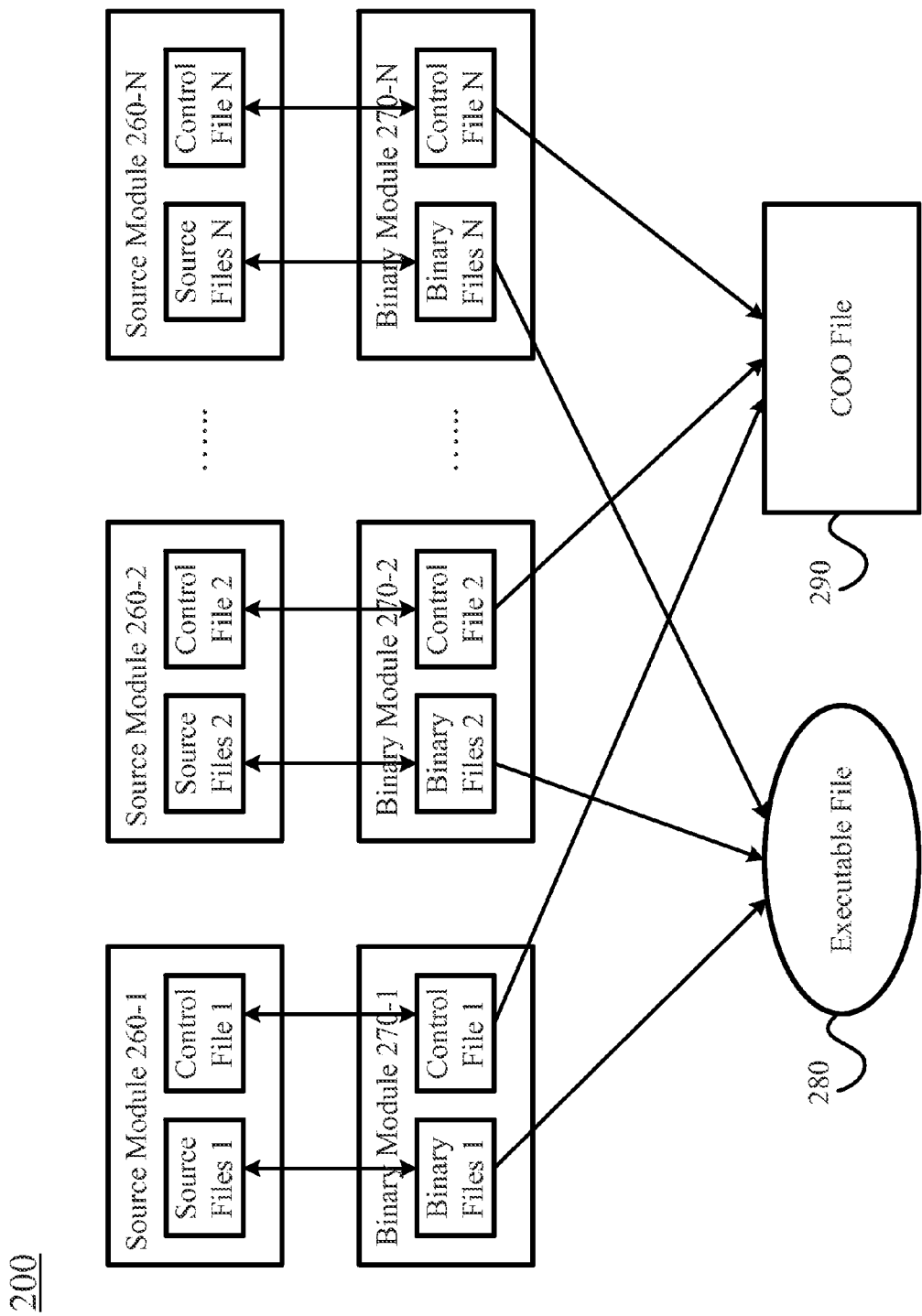
FIG. 3 schematically depicts a method of automatic generation of COO according to certain embodiments of the present disclosure.

FIGS. 2 and 3 schematically depict a method of automatic generation of COO according to certain embodiments of the present disclosure. In certain embodiments, the method 200 as described in FIGS. 2 and 3 may be implemented in the system 100 as shown in FIG. 1 by running the automatic COO generating application 153.

Referring to FIG. 2, when a user intends to compile a software or firmware system or package including an executable file 280 and a COO file 290, at operation 201, multiple source modules are provided. Referring to FIG. 3, the multiple source modules 260 may include N source modules 260-1, 260-2, . . . , and 260-N, wherein N is a positive integer. Each source module 260 may include a plurality of source files and a control file comprising COO of the source files in that source module. For example, the source module 260-1 includes a plurality of source files 1 and a control file 1 having COO information of the plurality of source files 1, the source module 260-2 includes a plurality of source files 2 and a control file 2 having COO information of the plurality of source files 2, . . . , and the source module 260-N includes a plurality of source files N and a control file N having COO information of the plurality of source files N.

In certain embodiments, the source modules 260 are split in a way such that the sources files in one module have the same origin and license. One of the reasons that open source and proprietary code cannot coexist in the same module is that some open licenses prohibit the coexistence of open source and proprietary code. Each module has a mandatory control file, which provides the origin, license and list of the source files. In one embodiment, each source module 260 has a mandatory control file, which provides the origin, license and list of the source files in the source module 260. In another embodiment, the origin, license, and list of source files may be embedded in at least one of the source files in the source module 260. For example, each source file may include at least one line started with an annotation symbol such as a symbol "#", followed by the origin and license of the source file.

Once the multiple source modules are provided, at operation 203, the compiling module 1531 processes and compiles the source modules 260 to generate or create multiple binary modules 270. During operation 203, the control file in each source module 260 is copied to the corresponding binary module 270, such that each binary module 270 includes the plurality of binary files and a corresponding control file.

In certain embodiments, as described above, the compiling module 1531 may include the preprocessor 15311, the compiler 15313, and the assembler 15315. Under this situation, the preprocessor 15311 processes the source files, and substitute all preprocessor directives in the original source code with actual library code that implements those directives, to form a substitution file. Then the compiler 15313 translates the substitution file into assembly language instructions, to form an assembly file written in assembly language. After that, the assembler 15315 converts the assembly file to create the binary file that is in binary format and is executable.

Optionally, in certain embodiments, the compiling module 1531 may not include the preprocessor 15311, the compiler 15313, and the assembler 15315, as long as the compiling module 1531 is capable of compiling the source modules 260 to generate the binary modules 270.

Referring to FIG. 3, the multiple binary modules 270 includes N binary modules 270-1, 270-2, . . . , and 270-N. Each binary module 270 may include a plurality of binary files and a copy of the control file. In certain embodiments, the copy of the control file in each binary module 270 is copied from the corresponding source module 260. For example, the binary module 270-1 includes a plurality of binary files 1 and a copy of the control file 1, the binary module 270-2 includes a plurality of binary files 2 and a copy of the control file 2, . . . , and the binary module 270-N includes a plurality of binary files N and a copy of the control file N.

Optionally, if the source file does not have a control file and the COO information is written in the at least one source files of the source module, the compiling module 1531 may retrieve the COO information from the source files or binary flies to create a COO file and store the COO file in the binary module.

Once the multiple binary modules are built from the source modules, at operation 205, the linker module 1533 combines the plurality of binary files from the multiple binary modules into an executable file 280. The executable file 280 may be a single executable file 280 in the format of a software image or a firmware image, or the executable file 280 may be an intermediate file which is capable of being further processed to form the software image or the firmware image. Once the executable file 280 is generated, the executable file 280 may be stored in the storage 150 for later use. At operation 207, the COO file processing module 1535 retrieves the copy of the control files 1 to N of the multiple binary modules 270-1 to 270-N. Then at operation 209, the COO file processing module 1535 generates the COO file 290 for the executable file according to the control files 1 to N. In certain embodiments, the COO file processing module 1535 retrieves all the information from the control files 1 to N, and combines the information in a predetermined manner.

Optionally, in certain embodiments, the storage 150 may store a standard reference COO file. The standard reference COO file includes identifiers of modules and corresponding COO information of the modules. The COO file processing module 1535 may compare the identifiers of the multiple binary modules with the identifiers of modules in the standard reference COO file. When the identifier of at least one binary module is found in the standard reference COO file, the COO file processing module 1535 retrieves the COO information of the corresponding at least one binary module from the standard reference COO file. When an identifier of at least another one binary module is not found in the standard reference COO file, the COO file processing module 1535 retrieves the COO information from the copy of the control files (or the control files) corresponding to that at least another one binary module. In certain embodiments, the COO file processing module 1535 may refer to the copy of the control files (or the control files) first to retrieve certain COO information, and then refer to the standard reference COO file to retrieve other COO information. After that, the COO information retrieved from the standard reference COO file and from the control files are combined to generate the COO file 290.

It should be particularly noted that the operations 205 and 207, although listed in sequence as shown in FIG. 2, may be performed in a different order. In certain embodiments, the operations 205 and 207 may be performed at the same time. In certain embodiments, the operation 205 may be performed before or after the operation 207.

In a further aspect, the present disclosure is related to a non-transitory computer readable medium storing computer executable code. The code, when executed at one or more processer of a computer device 100, may perform the method as described above. In certain embodiments, the non-transitory computer readable medium may include, but not limited to, the storage 150 as described above, or any other storage media of the computer device 100.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   at least one computing device, comprising one or more processors, a memory, and a storage storing computer executable code, wherein the computer executable code, when executed at the one or more processors, is configured to:
   process a plurality of source modules to generate a plurality of binary modules corresponding to the source modules, wherein each source module has at least one source file and a control file comprising a certificate of origin (COO) of the source module, and each binary module generated from each source module has at least one binary file corresponding to the at least one source file and a copy of the control file;
   combine the binary files of each of the binary modules to generate an executable file; and
   generate a COO file for the executable file based on the control files from the source modules or the binary modules by:
   for each of the source modules, determining whether an identifier of the source module is present in a standard reference COO file, wherein the standard reference COO file has a list of identifiers of a plurality of modules and COO information corresponding to the plurality of modules;
   when the identifier of one of the source modules is present in the standard reference COO file, retrieving the COO information corresponding to the identifier from the standard reference COO file as COO information of the one of the source modules;
   when the identifier of the one of the source modules is not present in the standard reference COO file, retrieving the COO information of the one of the source modules from the corresponding control file of the one of the source modules; and
   generating the COO file by combining the retrieved COO information of all of the source modules.

2. The system of claim 1, wherein the COO of each source module comprises at least one origin and at least one license of the corresponding source module.

3. The system of claim 1, wherein at least one of the source modules has a plurality of the source files having the same origin.

4. The system of claim 1, wherein the executable file is a software image file or a firmware image file.

5. The system of claim 1, wherein the computer executable code comprises:
   a compiling module configured to process the plurality of source modules to generate the plurality of binary modules corresponding to the source modules;
   a linker module configured to combine the binary files of each of the binary modules to generate the executable file; and
   a control file processing module configured to generate the COO file for the executable file based on the control files from the source modules or the binary modules.

6. The system of claim 1, wherein the standard reference COO file is stored in the storage.

7. The system of claim 1, wherein the identifier of each source module is a name of the source module.

8. The system of claim 1, wherein the at least one source file of the source modules is programmed in a customized programming language, or a set of automation scripts.

9. A method of generating a certificate of origin (COO) for a software or firmware, comprising:
   processing, at an automatic COO generating application being executed at one or more processors of at least one computing device, a plurality of source modules to generate a plurality of binary modules corresponding to the source modules, wherein each source module has at least one source file and a control file comprising a COO of the source module, and each binary module generated from each source module has at least one binary file corresponding to the at least one source file and a copy of the control file;
   combining, by the executed automatic COO generating application, the binary files of each of the binary modules to generate an executable file; and
   generating, by the executed automatic COO generating application, a COO file for the executable file based on the control files from the source modules or the binary modules, comprising:
   for each of the source modules, determining whether an identifier of the source module is present in a standard reference COO file, wherein the standard reference COO file has a list of identifiers of a plurality of modules and COO information corresponding to the plurality of modules;
   when the identifier of one of the source modules is present in the standard reference COO file, retrieving the COO information corresponding to the identifier from the standard reference COO file as COO information of the one of the source modules;
   when the identifier of the one of the source modules is not present in the standard reference COO file, retrieving the COO information of the one of the source modules from the corresponding control file of the one of the source modules; and
   generate the COO file by combining the retrieved COO information of all of the source modules.

10. The method of claim 9, wherein the COO of each source module comprises at least one origin and at least one license of the corresponding source module, and the executable file is a software image file or a firmware image file.

11. The method of claim 9, wherein at least one of the source modules has a plurality of the source files having the same origin.

12. The method of claim 9, wherein the automatic COO generating application comprises:
   a compiling module configured to process the plurality of source modules to generate the plurality of binary modules corresponding to the source modules;
   a linker module configured to combine the binary files of each of the binary modules to generate the executable file; and
   a control file processing module configured to generate the COO file for the executable file based on the control files from the source modules or the binary modules.

13. The method of claim 9, wherein the identifier of each source module is the name of the source module.

14. A non-transitory computer readable medium storing computer executable code, wherein the code, when executed at one or more processors of at least one computing device, is configured to:
   process a plurality of source modules to generate a plurality of binary modules corresponding to the source modules, wherein each source module has at least one source file and a control file comprising a certificate of origin (COO) of the source module, and each binary module generated from each source module has at least one binary file corresponding to the at least one source file and a copy of the control file;
   combine the binary files of each of the binary modules to generate an executable file; and
   generate a COO file for the executable file based on the control files from the source modules or the binary modules by:
      for each of the source modules, determining whether an identifier of the source module is present in a standard reference COO file, wherein the standard reference COO file has a list of identifiers of a plurality of modules and COO information corresponding to the plurality of modules;
      when the identifier of one of the source modules is present in the standard reference COO file, retrieving the COO information corresponding to the identifier from the standard reference COO file as COO information of the one of the source modules;
      when the identifier of the one of the source modules is not present in the standard reference COO file, retrieving the COO information of the one of the source modules from the corresponding control file of the one of the source modules; and
      generate the COO file by combining the retrieved COO information of all of the source modules.

15. The non-transitory computer readable medium of claim 14, wherein the COO of each source module comprises at least one origin and at least one license of the corresponding source module, and the executable file is a software image file or a firmware image file.

16. The non-transitory computer readable medium of claim 14, wherein at least one of the source modules has a plurality of the source files having the same origin.

17. The non-transitory computer readable medium of claim 14, wherein the code comprises:
   a compiling module configured to process the plurality of source modules to generate the plurality of binary modules corresponding to the source modules;
   a linker module configured to combine the binary files of each of the binary modules to generate the executable file; and
   a control file processing module configured to generate the COO file for the executable file based on the control files from the source modules or the binary modules.

18. The non-transitory computer readable medium of claim 14, wherein the identifier of each source module is the name of the source module.

19. The method of claim 9, wherein the at least one source file of the source modules is programmed in a customized programming language, or a set of automation scripts.

20. The non-transitory computer readable medium of claim 14, wherein the at least one source file of the source modules is programmed in a customized programming language, or a set of automation scripts.

* * * * *